April 21, 1931.  E. P. CHASE  1,801,767
APPARATUS FOR TESTING RAILROAD SIGNAL SYSTEMS
Filed Jan. 13, 1931
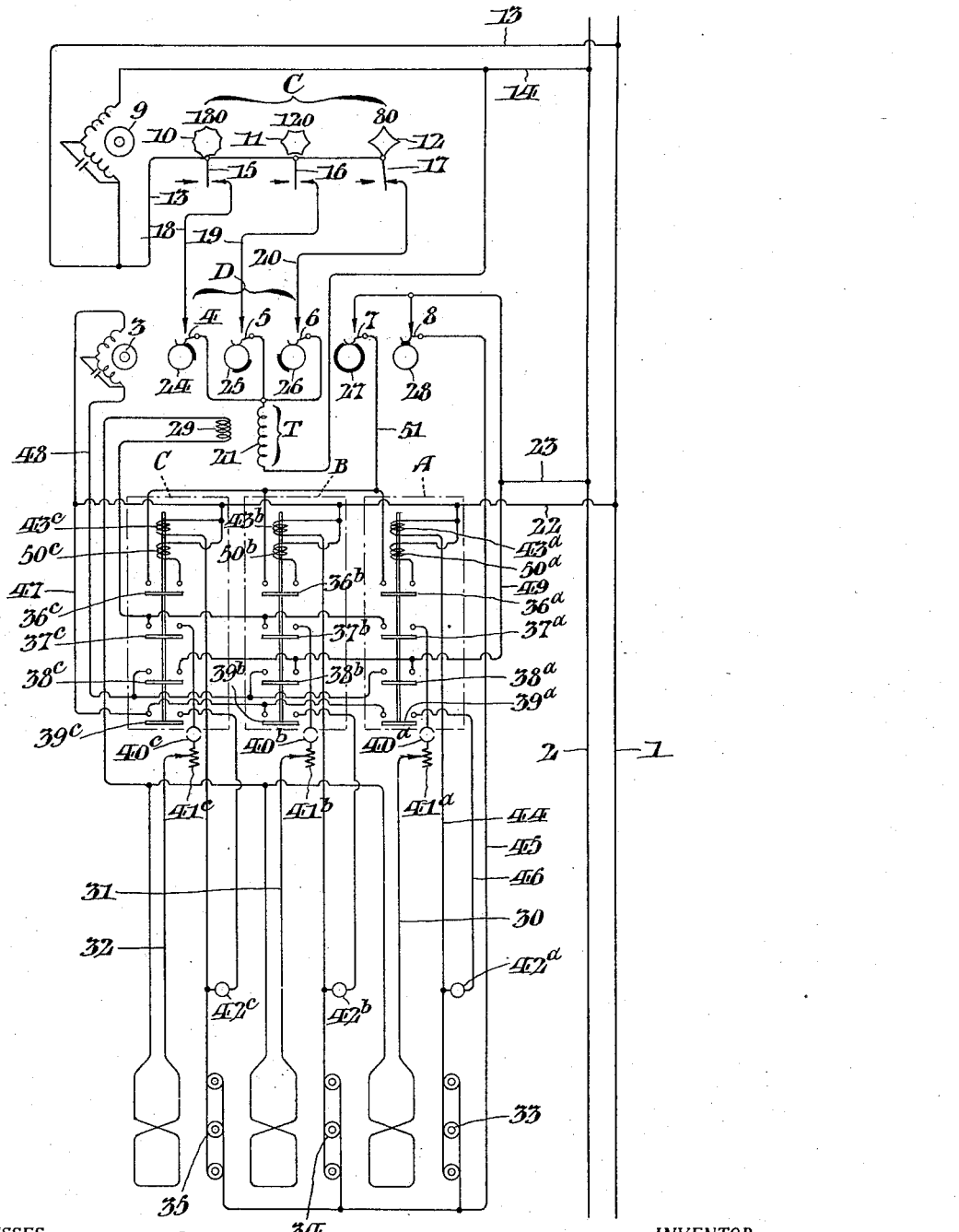
WITNESSES
INVENTOR:
Eugene P. Chase,
BY
ATTORNEYS.

Patented Apr. 21, 1931

1,801,767

UNITED STATES PATENT OFFICE

EUGENE P. CHASE, OF NARBERTH, PENNSYLVANIA

APPARATUS FOR TESTING RAILROAD-SIGNAL SYSTEMS

Application filed January 13, 1931. Serial No. 508,431.

My invention relates to an apparatus for testing railroad signal systems, and is particularly adapted for use with continuous inductive cab signal systems in which instrumentalities on a locomotive or a car respond to currents in a wayside circuit to provide at the engineman's station visible indications representing the condition of the trackway in advance. Such systems commonly include means for automatically sounding a warning whistle after a more restrictive indication is given, as well as means for suppressing the sounding of the warning whistle, and they may also include an automatic train control by which train brakes are automatically applied when a more restrictive indication is given, unless steps are taken to forestall the brake application. My invention, while susceptible of a variety of applications is particularly suited for use with such systems.

The object of the present invention is to provide means for testing the operation of the locomotive or car equipment. Such a test may be made preparatory to the departure of the vehicle from a terminal or while the vehicle is passing a designated wayside station, and the test is effected by automatically applying through the test circuit the various codes in a prescribed succession, each separate code being transmitted for a predetermined interval of time.

A more specific object of the invention is to provide a plurality of track circuits adapted for use in connection with a single code distributing and code transmitting device and so connected that when one track circuit is in use the remaining track circuits cannot be used unless the testing operation is initiated simultaneously on a number of the test track circuits.

A further object of the invention is to provide in such a testing apparatus a motor driven code distributing device adapted to selectively close and open a series of contacts in a prescribed succession, each contact being maintained in closed position for a predetermined time interval and then maintained in open position for a predetermined time interval before the next succeeding contact is closed.

Other objects and advantages characterizing the invention will be more apparent from the detailed description which follows, having reference to the accompanying drawing, in which there is illustrated one form or embodiment which the invention may take. The drawing shows a diagrammatic illustration of a testing apparatus designed for use on three test track circuits.

The main conductors 1 and 2 shown at the right of the figure indicate a source of current supply, such as alternating current at the voltage and frequency normally available for the signal system. Branch conductors 22 and 23 lead from the mains 1 and 2 through various relay contacts to a code distributor D comprising a motor 3 having a revolving cam shaft adapted when rotated at a constant speed to make and break a series of contacts 4, 5, 6, 7 and 8, in a prescribed succession and with a prescribed time interval for the operation of each contact. Associated with the code distributor D there is a code transmitter C which includes an induction motor 9 and revolving cams 10, 11 and 12. While a separate motor is here shown for driving the cams of the code transmitting and code distributing devices, it will be obvious that the motor 3 may be used to serve both purposes by inserting reduction gears of a suitable ratio between the cam shafts of the two devices.

Current is supplied to the code transmitting device C through conductors 13 and 14. Assuming that cams 10, 11 and 12 are rotated at a speed of 20 revolutions per minute, one finds that current passing from conductor 13 through contact 15 and conductor 18 is interrupted 180 times per minute, there being nine raised points on revolving cam 10. Current passing from conductor 13 through contact 16 and conductor 19 is interrupted 120 times per minute, there being six raised points on revolving cam 11. Current passing from conductor 13 through contact 17 and conductor 20 is interrupted 80 times per minute, there being four raised points on revolving cam 12. Accordingly, the current in the primary coil 21 of transformer T will be interrupted at 180, 120 or 80 times per minute, depending upon whether the circuit is made through contact 4, 5 or 6, respectively, of the code distributor D.

The code distributor motor 3 is preferably designed to run at a speed so that the interval between the operation of contacts 4, 5 and 6 will be about five or six seconds. From the diagrammatic illustration of the development of the code distributor cams 24, 25, 26, 27, 28, it will be evident that in the normal position of rest of motor 3, contact 8 will be closed, and that as the motor turns in a counter-clockwise direction, contacts 4, 5 and 6 will be closed in the order in which they are referred to and contact 7 will close with contact 4 and stay closed until five or six seconds after contact 6 has opened. Accordingly when the motor 3 is at rest no current from the code transmitter passes through the primary coil 21 of transformer T, but as the motor 3 turns, current with 180 interruptions per minute passes through the transformer T for a period of five or six seconds, the period during which contact 4 is closed; and then current with 120 interruptions per minute passes through the transformer T for a similar period while contact 5 is closed; and then current with 80 interruptions per minute passes through transformer T for a similar period while contact 6 is closed. Finally there is an interval while contact 7 is still closed, with contacts 4, 5 and 6 open, during which no code is supplied.

The coded current induced in the secondary coil 29 of transformer T passes to any one of a plurality (three being shown in the drawing) of track loops 30, 31, 32. These track loops may constitute test track circuits independent of the regular track circuits of the signal system or they may constitute the regular track circuits of the system. The selection of the track loops to be tested is accomplished by means of push button switches 33, 34 and 35 or other suitable means for making and breaking a circuit constituting the equivalent of a switch. Associated with each track loop 30, 31, 32 there is a relay A, B, C, and each relay is provided with four contacts 36, 37, 38, 39, designated with exponents corresponding to that of the relay to which they belong. In each track loop an ammeter 40, or a connection for an ammeter, and an adjustable resistance 41, similarly designated with exponents, are also provided so that the current in a track loop may be determined and may be properly regulated. Lamps 42, similarly designated with exponents, may also be provided, as shown, to indicate to a person at the testing station, preferably on the platform, that the operation of the device has been initiated on a particular track loop and that the push button may be released.

The operation of the testing apparatus is as follows: If it is desired to test the cab signal equipment of a locomotive passing over or standing on the track with which track loop 30 is associated, push button 33, which serves as the means for initiating the test, is pressed and is thereafter released as soon as the light appears at lamp 42a. When the push button 33 is pressed, current flows from main conductor 1 through conductor 22, coil 43a, conductor 44, push button 33 to conductor 45, and thence through contact 8 of the code distributor, which is normally closed, to conductor 23 and main conductor 2. Relay A being thus energized, its contacts all close together. The closing of contact 38a starts the code distributor motor 3, current passing from main conductor 2 and conductors 23 and 49 through contact 38a and conductor 48 to motor 3, and thence through conductors 47 and 22 to main conductor 1. The closing of contact 37a places the secondary coil 29 of transformer T in circuit with track loop 30. The closing of contact 36a forms a holding circuit after motor 3 has started, enabling the push button 33 to be released without de-energizing the relay A. Current flowing in said holding circuit passes from conductor 22 to coil 50a of relay A, and thence through contact 36a and conductor 51 to contact 7 of the code distributing device and thence to conductor 23.

When the code distributor is thus set into operation, its cams 24, 25, 26, 27 and 28 rotate in the manner heretofore described causing current, first with 180 interruptions per minute, then with 120 interruptions per minute, then with 80 interruptions per minute, to be induced in the secondary coil 29 of transformer T. Accordingly, the different codes are passed through track loop 30 and are received by the locomotive equipment giving various cab indications such as "clear," "approach restricting" and "approach." After contacts 4, 5 and 6 of the code distributor have operated, contact 7 remains closed for an interval of five or six seconds during which no code is present in track loop 30 and the most restrictive signal is received by the locomotive. Finally contact 7 is broken and coil 50a of relay A is de-energized causing all of the relay contacts 36a, 37a, 38a and 39a of the relay to open, and bringing the motor 3 of the code distributor D to rest with contact 8 closed.

To test locomotives on track loops 31 and 32, push buttons 34 and 35 are used. The resulting operation of relay B or C, according to whether push button 34 or 35 is pressed, is precisely similar to the operation of relay A already described, and the circuits may be readily traced on the drawing.

It is to be noted that if one push button, 33 for example, is pressed, and motor 3 has commenced to turn so that contact 8 of the code distributor D is broken, it is thereafter impossible to energize the other relays B and C until the test has been completed on track loop 30. However, if push buttons 33, 34 and 35 are all pressed simultaneously, all of the relays A, B and C will be energized together and the tests on the three track loops 30, 31 and 32 may be conducted simultaneously. In the same manner, any two track loops may be selected for simultaneous operation. Inasmuch as it is desired at times to make a number of tests simultaneously, transformer T is designed to have a sufficient capacity to supply several track loops in multiple.

It will be evident from the description thus far that the single act of pressing a push button will cause the testing apparatus to automatically perform in the desired sequence all of the operations required to make a complete test of a locomotive signal equipment, and that the various codes transmitted will follow one after another with a definite time interval between each code. Furthermore, the tests may be performed at a terminal or wayside station and with the locomotives to be tested either standing or running.

While I have described my invention in some detail and with reference to a specific embodiment thereof, it will be apparent to those skilled in the art that various changes may be made in the form of the apparatus disclosed without departing from the spirit of my invention as defined in the claims, and that certain features of the invention may at times be used to advantage without a corresponding use of other features.

Having thus described my invention, I claim:—

1. An apparatus for testing a railroad signal system having a track circuit, said apparatus comprising a test circuit including code transmitting devices for inducing a series of different coded currents in said track circuit, and a code distributor having a revolving cam shaft and contacts associated therewith for automatically rendering said code transmitting devices effective in inducing different coded currents in said track circuit in a prescribed succession and with a prescribed time interval between each code.

2. An apparatus for testing a railroad signal system having a track circuit, said apparatus comprising a test circuit including code transmitting devices for inducing a series of different coded currents in said track circuit, a code distributor having a revolving cam shaft and contacts associated therewith for automatically rendering said code transmitting devices effective in inducing different coded currents in said track circuit in a prescribed succession and with a prescribed time interval between each code, and means whereby the operation of said code transmitting and distributing devices is automatically discontinued after all of the coded currents have been induced in the track circuit.

3. An apparatus for testing a railroad signal system having a plurality of track circuits, said apparatus comprising a test circuit including code transmitting devices, and a single transformer for inducing different coded currents in any one of said track circuits, means for automatically rendering said code transmitting devices effective in inducing different coded currents in said track circuits, and means for selectively initiating the test upon any one of said track circuits.

4. An apparatus for testing a railroad signal system having a plurality of track circuits, said apparatus comprising a test circuit including code transmitting devices and a single transformer for inducing different coded currents in any one of said track circuits, means for automatically rendering said code transmitting devices effective in inducing different coded currents in said track circuits, and means for simultaneously initiating the test upon two or more of said track circuits.

5. An apparatus for testing a railroad signal system having a plurality of track circuits, said apparatus comprising a test circuit including code transmitting devices and a single transformer for inducing different coded currents in any one of said track circuits, means for automatically rendering said code transmitting devices effective in inducing different coded currents in said track circuits, means for selectively initiating a test upon any one of said track circuits and means whereby when said test is initiated upon one track circuit, it cannot be performed upon the others until the first test is completed.

In testimony whereof, I have hereunto signed my name at Philadelphia, Pa., this 9th day of January, 1931.

EUGENE P. CHASE.